United States Patent
Tu et al.

(10) Patent No.: US 12,513,459 B2
(45) Date of Patent: Dec. 30, 2025

(54) SOUND RECEIVING PROCESSING METHOD AND SOUND SIGNAL PROCESSING APPARATUS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 197 days.

(21) Appl. No.: 18/416,911

(22) Filed: Jan. 19, 2024

(65) Prior Publication Data
US 2025/0133338 A1    Apr. 24, 2025

(30) Foreign Application Priority Data
Oct. 19, 2023   (TW) .................................. 112140061

(51) Int. Cl.
*H04R 3/00* (2006.01)
*G01S 11/14* (2006.01)
*H04R 1/40* (2006.01)

(52) U.S. Cl.
CPC .............. *H04R 3/005* (2013.01); *G01S 11/14* (2013.01); *H04R 1/406* (2013.01)

(58) Field of Classification Search
CPC .......... H04R 3/005; H04R 1/406; G01S 11/14
See application file for complete search history.

(56) References Cited

U.S. PATENT DOCUMENTS

| | | | |
|---|---|---|---|
| 2019/0326989 A1 | 10/2019 | McElveen | |
| 2025/0133338 A1* | 4/2025 | Tu | H04R 1/406 |

FOREIGN PATENT DOCUMENTS

| | | | | |
|---|---|---|---|---|
| CN | 101031956 | | 9/2007 | |
| CN | 113870886 | | 12/2021 | |
| CN | 114009064 | | 2/2022 | |
| CN | 114827795 | | 7/2022 | |
| CN | 119905102 A | * | 4/2025 | ........... G10L 21/028 |
| TW | 200706052 | | 2/2007 | |
| TW | 201916611 | | 4/2019 | |

* cited by examiner

*Primary Examiner* — Daniel Pihulic
(74) *Attorney, Agent, or Firm* — JCIPRNET (57) ABSTRACT

A sound receiving processing method and a sound signal processing apparatus are provided. In the method, multiple input sound signals are received through a microphone array. The input sound signals are combined into a main sound signal based on beamforming. Multiple primary extraction signals belonging to the main sound signal are respectively extracted from the input sound signals. Multiple estimated sound source signals corresponding to the sound sources are separated from the primary extraction signals through blind signal separation. Multiple re-extraction signals belonging to the estimated sound source signals are respectively extracted from the primary extraction signals. A distance of the first source relative to the microphone array is determined according to a power ratio. One of the estimated sound source signals corresponding to the first source is determined according to a distance limit. Therefore, the sound signal from the desired sound source could be obtained.

16 Claims, 6 Drawing Sheets

FIG. 7

SOUND RECEIVING PROCESSING METHOD AND SOUND SIGNAL PROCESSING APPARATUS

CROSS-REFERENCE TO RELATED APPLICATION

This application claims the priority benefit of Taiwan application serial no. 112140061, filed on Oct. 19, 2023. The entirety of the above-mentioned patent application is hereby incorporated by reference herein and made a part of this specification.

BACKGROUND

Technical Field

The disclosure relates to a sound signal processing technology, and in particular to a sound receiving processing method and a sound signal processing apparatus.

Description of Related Art

In order to enable mobile apparatuses to have better recording and call quality, many noise reduction signal processing applications are provided, among which the beamforming algorithm is the most popular signal processing technology. The beamforming technology on the market can eliminate ambient noise and retain only the sound signal directly in front of the mobile apparatus.

However, when an interference signal and the user are both directly in front of the mobile apparatus, the current beamforming algorithm cannot distinguish which sound needs to be retained, and the interference signal may affect a sound signal of the user.

SUMMARY

Embodiments of the disclosure provide a sound receiving processing method and a sound signal processing apparatus, which can distinguish sound sources and retain a sound signal from target a source.

The sound receiving processing method of the embodiment of the disclosure includes (but is not limited to) the following steps. Multiple input sound signals are received through a microphone array. The microphone array includes multiple microphones respectively receiving the input sound signals. The input sound signals are combined into a main sound signal based on beamforming. The beamforming is used to form the microphone array into a radiation pattern corresponding to a first source among multiple sound sources, and a first microphone in the microphone array is closer to the first source than other microphones. Multiple primary extraction signals belonging to the main sound signal are respectively extracted from the input sound signals. Multiple first sound feature correlations between the input sound signals and the main sound signal are respectively trained in advance, and the first sound feature correlation is used to extract a part belonging to the main sound signal. Multiple estimated sound source signals corresponding to the sound sources are separated from the primary extraction signals through blind signal separation (BSS). Multiple re-extraction signals belonging to the estimated sound source signals are respectively extracted from the primary extraction signals. Multiple second sound feature correlations between the primary extraction signals and the estimated sound source signals are respectively trained in advance, and the second sound feature correlations are respectively used to extract parts belonging to the estimated sound source signals. A distance of the first source relative to the microphone array is determined according to a power ratio. The power ratio is a ratio of a first value to a second value, the first value is a sum of powers of the re-extraction signals corresponding to the first source and corresponding to other microphones that are not the first microphone in the microphone array, the second value is a power of one of the re-extraction signals corresponding to the first source and corresponding to the first microphone, the smaller the power ratio, the closer the distance of the first source relative to the microphone array, and the greater the power ratio, the further the distance of the first source relative to the microphone array. One of the estimated sound source signals corresponding to the first source is determined according to a distance limit. The distance of the first source relative to the microphone array is within the distance limit.

The sound signal processing apparatus of the embodiment of the disclosure includes a microphone array, a storage, and a processor. The microphone array includes multiple microphones respectively receiving multiple input sound signals. The storage is used to store a program code. The processor is coupled to the microphone array and the storage. The processor is used to load the program code to execute the following. The input sound signals are combined into a main sound signal based on beamforming. The beamforming is used to form the microphone array into a radiation pattern corresponding to a first source among multiple sound sources, and a first microphone in the microphone array is closer to the first source than other microphones. Multiple primary extraction signals belonging to the main sound signal are respectively extracted from the input sound signals. Multiple first sound feature correlations between the input sound signals and the main sound signal are respectively trained in advance, and the first sound feature correlation is used to extract a part belonging to the main sound signal. Multiple estimated sound source signals corresponding to the sound sources are separated from the primary extraction signals through blind signal separation. Multiple re-extraction signals belonging to the estimated sound source signals are respectively extracted from the primary extraction signals. Multiple second sound feature correlations between the primary extraction signals and the estimated sound source signals are respectively trained in advance, and the second sound feature correlations are respectively used to extract parts belonging to the estimated sound source signals. A distance of the first source relative to the microphone array is determined according to a power ratio. The power ratio is a ratio of a first value to a second value, the first value is a sum of powers of the re-extraction signals corresponding to the first source and corresponding to other microphones that are not the first microphone in the microphone array, the second value is a power of one of the re-extraction signals corresponding to the first source and corresponding to the first microphone, the smaller the power ratio, the closer the distance of the first source relative to the microphone array, and the greater the power ratio, the further the distance of the first source relative to the microphone array. One of the estimated sound source signals corresponding to the first source is determined according to a distance limit. The distance of the first source relative to the microphone array is within the distance limit.

Based on the above, the sound receiving processing method and the sound signal processing apparatus of the embodiments of the disclosure can distinguish the sound source signals through beamforming, sound extraction, and blind signal separation to determine the relative distance of the sound source signal corresponding to the source, so as to determine the sound source signal of the specific source. In this way, the sound signals of other users covered within the radiation pattern can be removed, thereby improving recording and call quality.

In order for the features and advantages of the disclosure to be more comprehensible, the following specific embodiments are described in detail in conjunction with the drawings.

DESCRIPTION OF THE EMBODIMENTS

Figure 1:
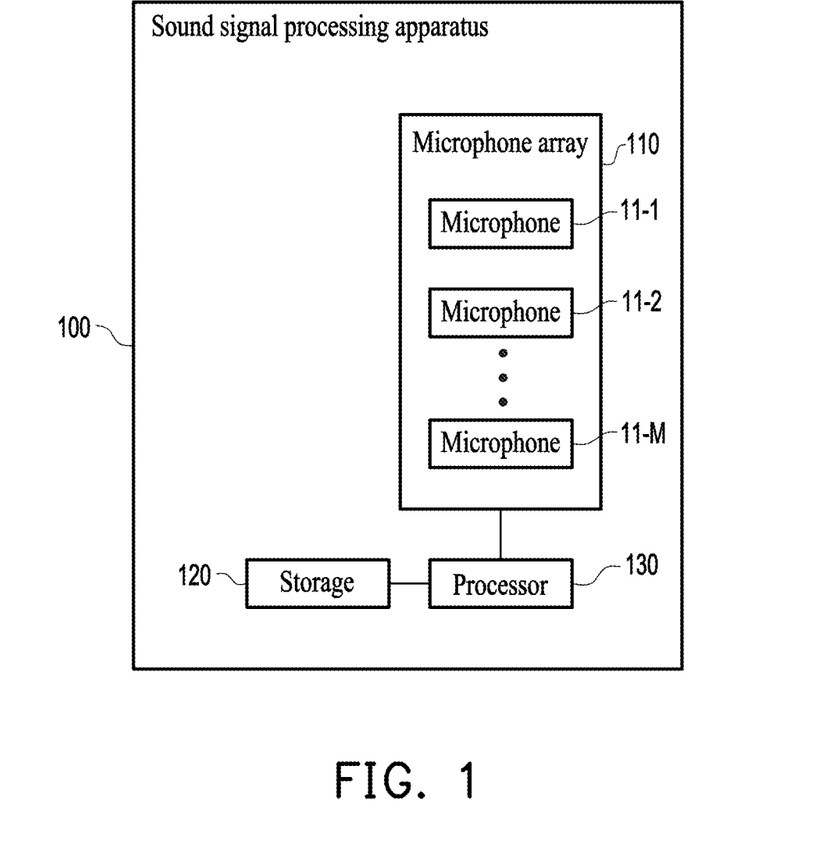
FIG. 1 is an element block diagram of a sound signal processing apparatus according to an embodiment of the disclosure.

FIG. 1 is an element block diagram of a sound signal processing apparatus 100 according to an embodiment of the disclosure. Please refer to FIG. 1. The sound signal processing apparatus 100 includes (but is not limited to) a microphone array 110, a storage 120, and a processor 130. The sound signal processing apparatus 100 may be a smartphone, a recording pen, a tablet computer, an intelligent assistant apparatus, a wearable apparatus, a vehicle system, a notebook computer, or other electronic apparatuses.

The microphone array 110 includes multiple microphones 11-1, 11-2, . . . , 11-M (M is a positive integer greater than one or greater than two). The microphones 11-1, 11-2, . . . , 11-M may be dynamic, condenser, or electret condenser microphones. The microphones 11-1, 11-2, . . . , 11-M may also be combinations of other electronic elements, analog to digital converters, filters, and audio processors that can receive sound waves (for example, human voice, environmental sound, machine operation sound, etc.) (that is, radio or recording) to be converted into sound signals.

Figure 2:
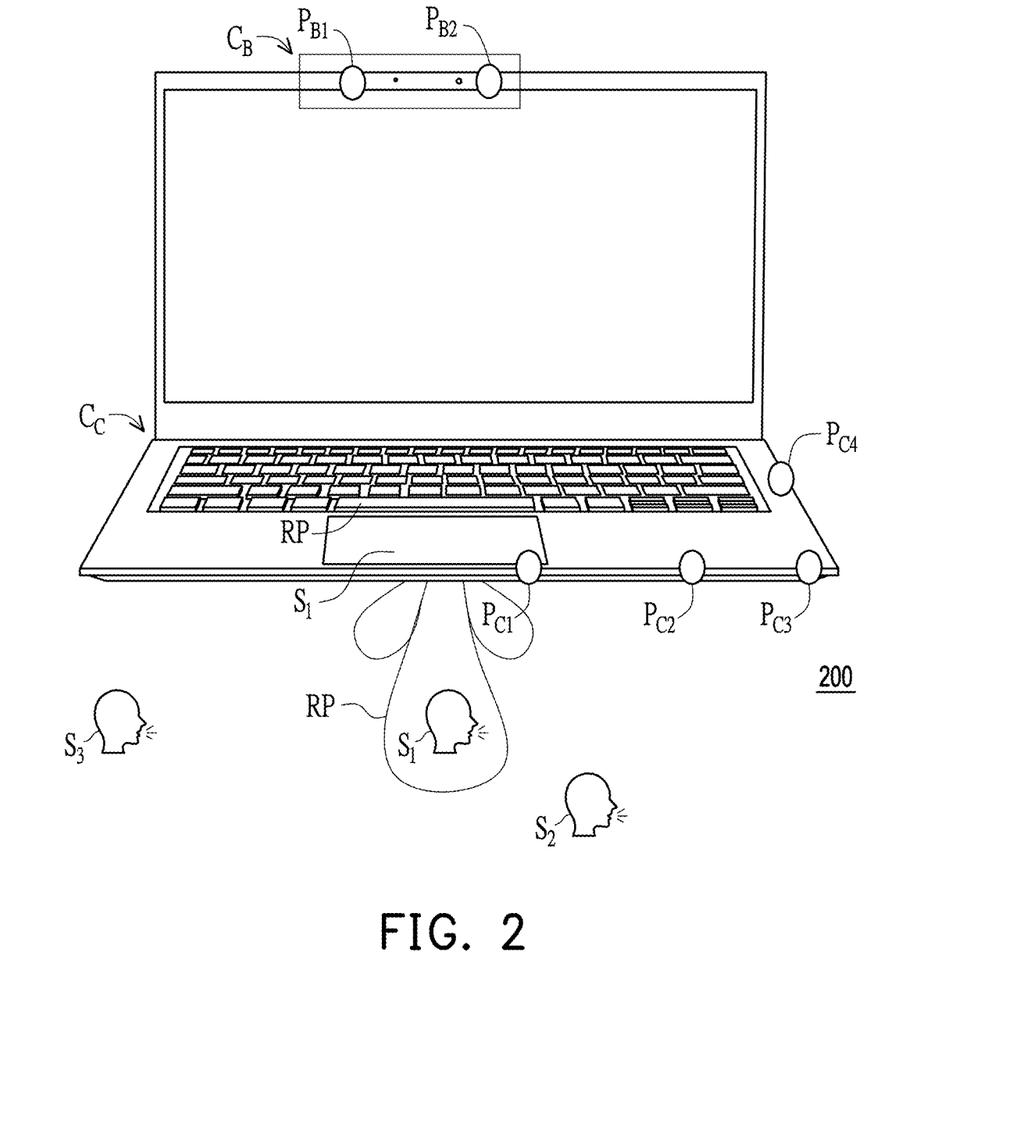
FIG. 2 is a schematic diagram of an installation position of a microphone and a radiation pattern according to an embodiment of the disclosure.

FIG. 2 is a schematic diagram of an installation position of a microphone and a radiation pattern according to an embodiment of the disclosure. Please refer to FIG. 2. The sound signal processing apparatus 100 takes a notebook computer 200 as an example. It is assumed that notebook computer 200 includes microphones 11-1 to 11-3 (for example, M is 3). Positions $P_{C1}$ to $P_{C4}$ of a C member (also referred to as a C surface/cover) $C_C$ of the notebook computer 200 may be used to install the microphone 11-1, and positions $P_{B1}$ to $P_{B2}$ of a B member (also referred to as a B surface/cover) $C_B$ may be used to install the microphones 11-2 and 11-3. Generally speaking, a main user (for example, a sound source $S_1$) is located directly in front of the notebook computer 200 (for example, in a direction that the B member $C_B$ is facing). The microphone 11-1 disposed on the C member $C_C$ is closer to the sound source $S_1$ (hereinafter referred to as a first source) than the other microphones 11-2 and 11-3 disposed on the B member $C_B$.

It should be noted that there may be other changes in the number and the installation positions of the microphones 11-1, 11-2, . . . , 11-M.

The storage 120 may be any type of fixed or removable random access memory (RAM), read only memory (ROM), flash memory, hard disk drive (HDD), solid-state drive (SSD), or similar elements. In an embodiment, the storage 120 is used to store program codes, software modules, configurations, data (for example, sound signals, algorithm parameters, etc.), or files, and an embodiment thereof will be described in detail later.

The processor 130 is coupled to the microphone array 110 and the storage 120. The processor 130 may be a central processing unit (CPU), a graphics processing unit (GPU), other programmable general-purpose or specific-purpose microprocessors, digital signal processors (DSPs), programmable controllers, field programmable gate arrays (FPGAs), application-specific integrated circuits (ASICs), neural network accelerators, other similar elements, or a combination of the above elements. In an embodiment, the processor 130 is used to execute all or part of the operations of the sound signal processing apparatus 100 and may load and execute each program code, software module, file, and data stored in the storage 120. In some embodiments, the functions of the processor 130 may be implemented through software or a chip.

In the following, the method described in the embodiment of the disclosure will be explained with reference to each element and module in the sound signal processing apparatus 100 and/or the notebook computer 200. Each process of the method may be adjusted according to the implementation situation and is not limited thereto.

Figure 3:
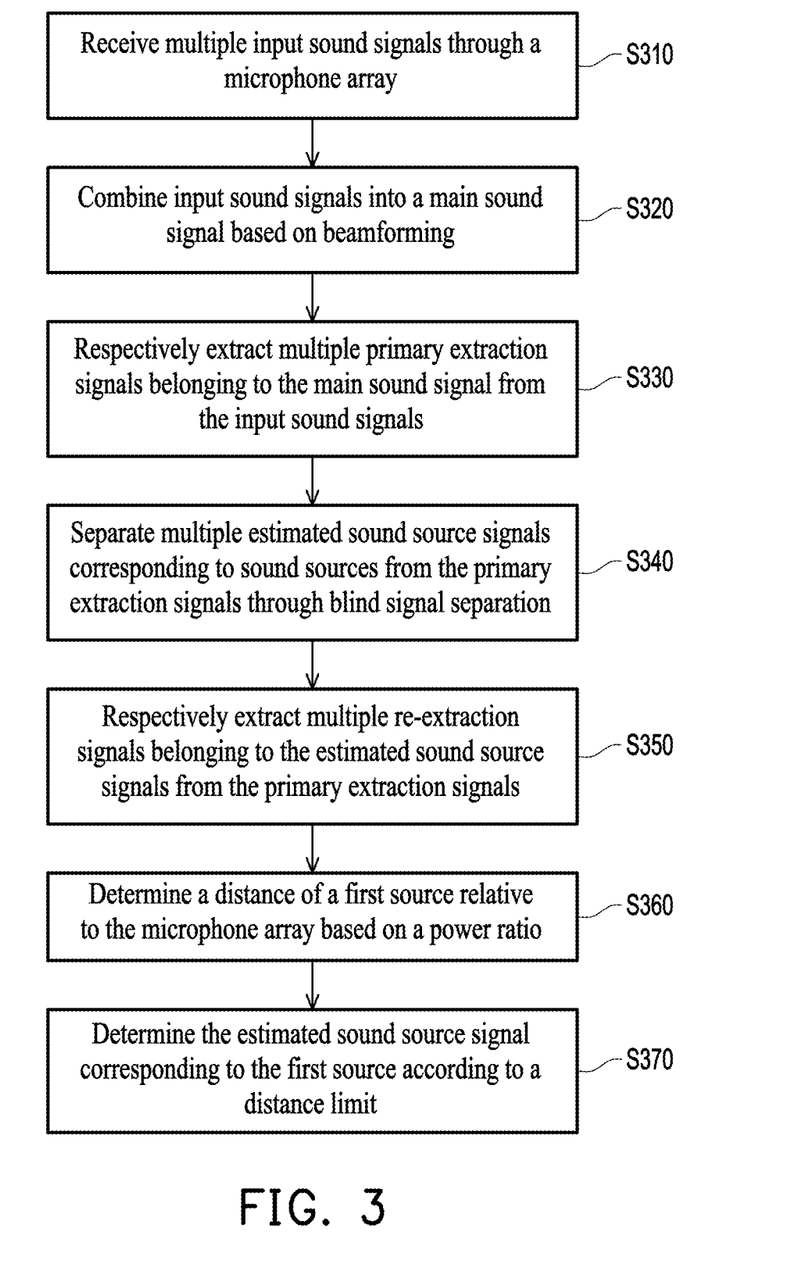
FIG. 3 is a flowchart of a sound receiving processing method according to an embodiment of the disclosure.

FIG. 3 is a flowchart of a sound receiving processing method according to an embodiment of the disclosure. Please refer to FIG. 3. The processor 130 receives multiple input sound signals through the microphone array 110 (Step S310). Specifically, the microphones 11-1, 11-2, . . . , 11-M respectively receive multiple sound signals. For example, each microphone 11-1, 11-2, . . . , 11-M receives a sound wave (for example, human voice, environmental sound, machine operation sound, etc.) (that is, radio or recording), and converts the sound wave into the input sound signal.

The processor 130 combines the input sound signals into a main sound signal based on beamforming (Step S320). Specifically, the beamforming is used to form the microphone array 11 into a radiation pattern corresponding to the first source among multiple sound sources. Beamforming enables constructive interference of signals at certain angles and destructive interference of signals at other angles through adjusting a parameter (for example, a phase and/or an amplitude) of a basic unit of a phased array. Therefore, different parameters form different radiation/beam patterns, and pointing angles of main beams may be different. The processor 130 may pre-define or generate a pointing angle, such as 90°, 85°, or 105°, of the radiation pattern based on an input operation by the user, but not limited thereto.

Figure 4:
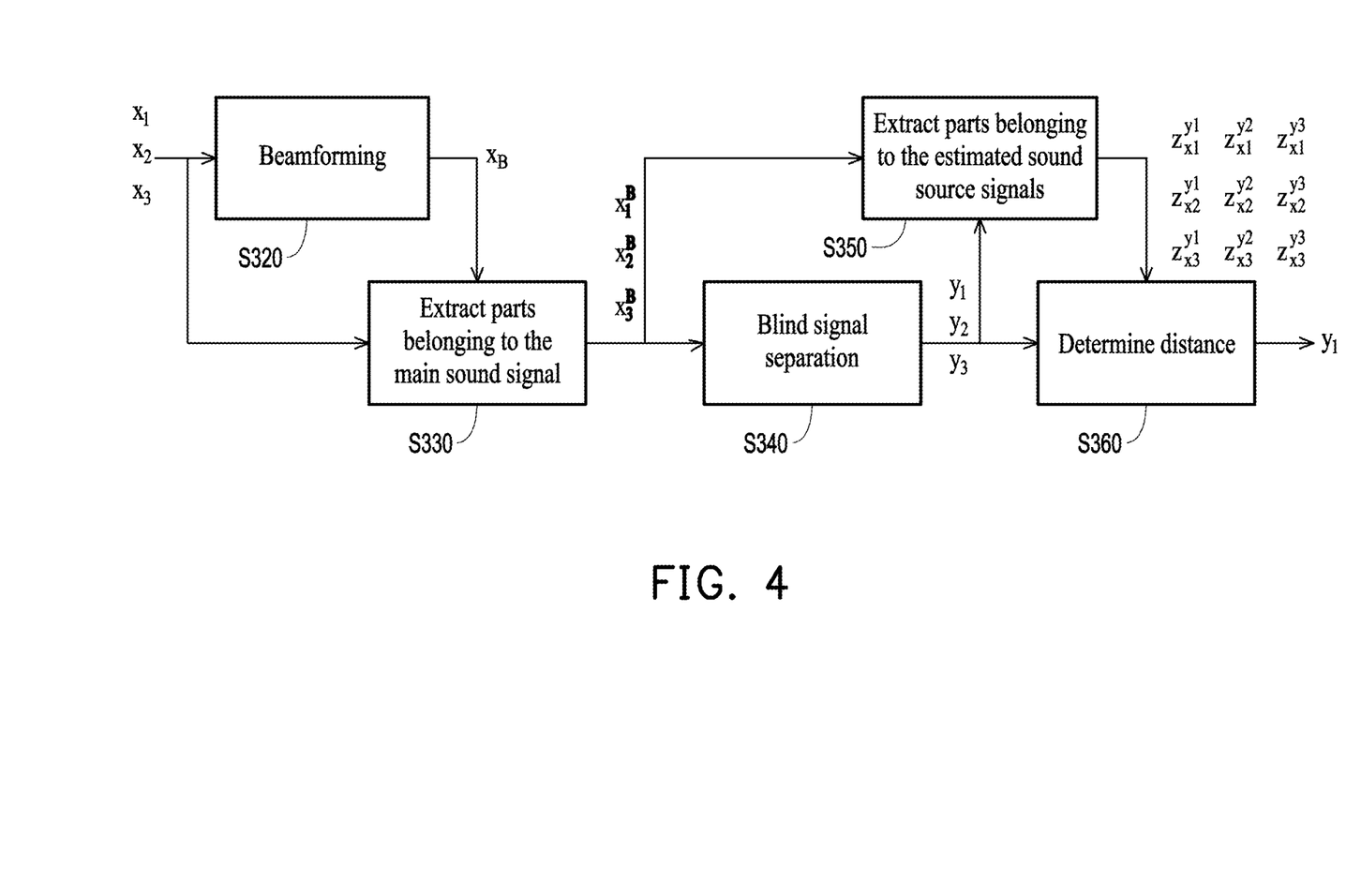
FIG. 4 is a schematic diagram illustrating signal processing according to an embodiment of the disclosure.

Taking FIG. 2 as an example, generally speaking, the main user is located in front of the apparatus. It is assumed that the microphone 11-1 is installed at the position $P_{C1}$, and the microphones 11-2 and 11-3 are respectively installed at the positions $P_{B1}$ and $P_{B2}$. The microphone 11-1 is closer to a certain sound source $S_1$ (that is, the first source) than other microphones 11-2 and 11-3. FIG. 4 is a schematic diagram illustrating signal processing according to an embodiment of the disclosure. Please refer to FIG. 2. It is assumed that the three microphones 11-1 to 11-3 respectively receive input sound signals $x_1$, $x_2$, and $x_3$. The processor 130 respectively adjusts the amplitude and/or the phase of the input sound signals $x_1$, $x_2$, and $x_3$ of the microphones 11-1 to 11-3, and sums the adjusted input sound signals $x_1$, $x_2$, and $x_3$ to generate a main sound signal $X_B$. The main sound signal $X_B$ may form a radiation pattern RP (with a pointing angle toward the bottom of the drawing, such as a direction that the B member $C_B$ is facing). As shown in FIG. 2, a sound signal of the sound source $S_1$ within the coverage of the radiation pattern RP has a higher gain, but sound signals of other sound sources $S_2$ and $S_3$ outside the coverage of the radiation pattern RP have lower gains (or are even removed).

Please refer to FIG. 3. The processor 130 respectively extracts multiple primary extraction signals belonging to the main sound signal from the input sound signals (Step S330). Specifically, the processor 130 or other apparatuses/processors may train multiple first sound feature correlations between the input sound signals and the main sound signal in advance, and the first sound feature correlations are used to extract parts belonging to the main sound signal. There are many types of sound features, such as fundamental frequency, octave frequency, speaking speed, or sentence pause, but not limited thereto. The main sound signal may be assumed to belong to a sound source signal from a certain sound source. Each first sound feature is correlated with a sound feature known to belong to the main sound signal and is trained to obtain only the part belong to the main sound signal from the input sound signal according to the sound feature of the main sound signal. This first sound feature correlation may be a lookup table, a mathematical relational expression, or a conversion model based on machine learning. In other words, each first sound feature correlation understands a conversion relationship between the corresponding input sound signal and the main sound signal, and may be used to extract or convert the part of the input sound signal belonging to the main sound signal.

In an embodiment, the processor 130 may respectively train the first sound feature correlations between the main sound signal and multiple known input signals corresponding to the microphones 11-1 to 11-M of the microphone array 110 through a machine learning algorithm. The machine learning algorithm is a backpropagation multi-layer perceptron (MLP), a recurrent neural network (RNN), or a temporal convolutional network (TCN) (for example, Conv-TasNet), but not limited thereto. Each first sound feature correlation includes a weight coefficient corresponding to an extraction model of the microphone 11-1, . . . , 11-M. In other words, the extraction model is a model based on the machine learning algorithm. During a training process of the extraction model, the part belonging to the main sound signal of the known input signal received by each microphone 11-1, . . . , 11-M is known, so each known input signal (that is, a known model output sample) and the part belonging to the main sound signal (that is, a known model output sample) may be used as training samples for the extraction model, so as to train/optimize the extraction model.

Figure 5:
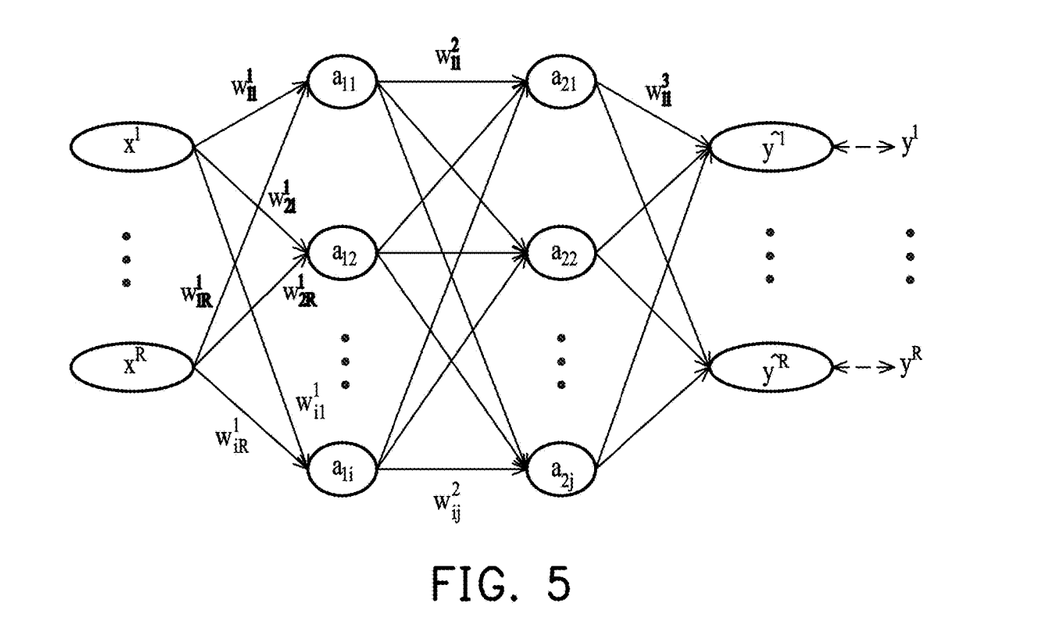
FIG. 5 is a schematic diagram illustrating a network architecture according to an embodiment of the disclosure.

FIG. 5 is a schematic diagram illustrating a network architecture according to an embodiment of the disclosure. Please refer to FIG. 5. Taking the backpropagation multi-layer perceptron as an example, $x^1$ to $x^R$ are sampling signals of the known input signal received by a certain microphone 11-1, . . . , 11-M (R is a sampling number), and $y^1$ to $y^R$ are the parts of the known input signal belonging to the main sound signal. An input vector of training samples is $\{(x^1, y^1), \ldots, (x^r, y^r), \ldots, (x^R, y^R)\}$, where r is an integer from 1 to R. Neurons of a hidden layer are $a_{11}$ to $a_{1i}$ and $a_{21}$ to $a_{2j}$, where i and j are positive integers (whose values are not limited). For example, the value of an is a product $x^1$ of and $w_{11}{}^l$. The weight coefficient is $W=\{(w_{11}{}^l, \ldots, w_{1j}{}^l), (w_{21}{}^l, \ldots, w_{2j}{}^l), \ldots (w_{i1}{}^l, \ldots, w_{ij}{}^l)\}$, where l is a positive integer.

In an embodiment, the processor 130 may define a loss function. The loss function is based on a difference between the part of the known input signal of each microphone 11-1, . . . , 11-M estimated to belong to the main sound signal based on the first sound feature correlation and the (real) main sound signal. For example, the loss function is $$L(W) = \frac{1}{R} \left\| \sum (f(x^r; W) - y^r) \right\|,$$

$f(\ )$ is the extraction model, and $f(x^r; W)$ is a signal output by the extraction model configured a weight coefficient W by inputting the sampling signal $x^r$ of the known input signal (for example, a predicted output sampling signal $\hat{y}^1$ to $\hat{y}^R$, that is, the part of the known input signal estimated to belong to the main sound signal based on the first sound feature correlation). It should be noted that the loss function may also be based on mean square error, root mean square error, mean absolute error, or other objective functions.

The processor 130 may minimize the loss function to determine the weight coefficient of the extraction model. For example, $$W^* = \underset{W}{\mathrm{argmin}}\ L(W),$$

where W* is the weight coefficient of the minimized loss function.

Then, the processor 130 may respectively extract multiple primary extraction signals belonging to the main sound signal from the input sound signals using the extraction model with the weight coefficient. Taking FIG. 4 as an example, the processor 130 may respectively extract primary extraction signals $x_1{}^B$, $x_2{}^B$, and $x_3{}^B$ belonging to a main sound signal $x_B$ from the input sound signals $x^1$, $x^2$, and $x^3$ of the microphones 11-1 to 11-3.

Please refer to FIG. 3. The processor 130 separates multiple estimated sound source signals corresponding to the sound sources from the primary extraction signals through blind signal separation (Step S340). Specifically, in practical application scenarios, the case where multiple sound sources appear at the same time often occurs. "Blind" refers to a mixed signal formed by receiving the sound signals (also referred to as the sound source signals) from the sound sources, and one of the goals of a blind signal separation algorithm includes separating the sound signals of the main sound source in the case where there are only mixed signals.

Figure 6:
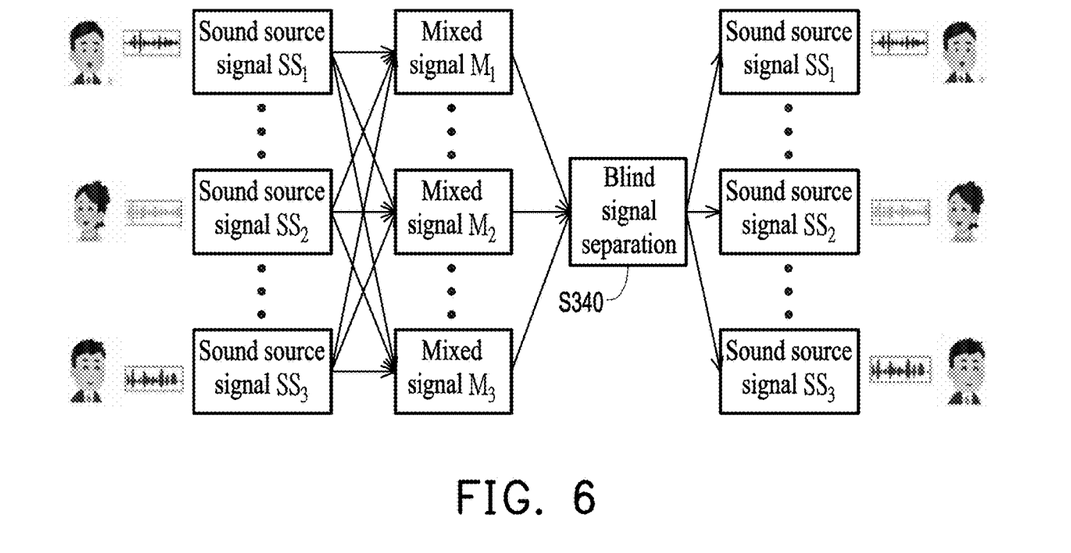
FIG. 6 is a schematic diagram illustrating blind signal separation according to an embodiment of the disclosure.

For example, FIG. 6 is a schematic diagram illustrating blind signal separation according to an embodiment of the disclosure. Please refer to FIG. 6. It is assumed that there are three users in the environment. The three users respectively generate sound source signals $SS_1$, $SS_2$, and $SS_3$. The input sound signals received by the three microphones 11-1 to 11-3 are respectively mixed signals $M_1$, $M_2$, and $M_3$. The mixed signals $M_1$, $M_2$, and $M_3$ may all include the sound source signals $SS_1$, $SS_2$, and $SS_3$. Blind signal separation is used to separate the sound source signals $SS_1$, $SS_2$, and $SS_3$ from the mixed signals $M_1$, $M_2$, and $M_3$.

A blind information separation algorithm is, for example, an independent component analysis (ICA) algorithm, an independent vector analysis (IVA), a sparse component analysis (SCA) algorithm, an independent low-rank matrix analysis (ILRMA) in tensorizing BSS. Taking an independent low-rank matrix as an example, the analysis thereof integrates the independent vector analysis and a non-negative matrix factorization, replacing a vector source model in the independent vector analysis using a low-rank time-frequency structure source model.

Taking FIG. 4 as an example, estimated sound source signals $y_1$, $y_2$, and $y_3$ corresponding to the three sound sources may be separated from the primary extraction signals $x_1^B$, $x_2^B$, and $x_3^B$ through blind signal separation.

In some application scenarios, the number of the microphones 11-1 to 11-M is greater than or equal to the number of estimated sound source signals to be separated.

Please refer to FIG. 3. The processor 130 respectively extracts multiple re-extraction signals belonging to the estimated sound source signals from the primary extraction signals (Step S350). Specifically, the processor 130 or other apparatuses/processors may respectively train multiple second sound feature correlations between the primary extraction signals and the estimated sound source signals in advance, and the second sound feature correlations are respectively used to extract parts belonging to the estimated sound source signals. Each estimated sound source signal may be assumed to belong to the sound source signal from a certain sound source. Each second sound feature is correlated with a sound feature known to belong to a certain estimated sound source signal and is trained to obtain the part belonging only to the estimated sound source signal from the primary extraction signal according to the sound feature of the estimated sound source signal. The second sound feature correlation may be a lookup table, a mathematical relational expression, or a conversion model based on machine learning. In other words, each second sound feature correlation understands a conversion relationship between the corresponding primary extraction signal and the estimated sound source signal, and may be used to extract or convert the part of the primary extraction signal belonging to the estimated sound source signal.

In an embodiment, the processor 130 may respectively train the second sound feature correlations between the estimated sound source signals and the known input signals corresponding to the microphones 11-1 to 11-M of the microphone array 110 through a machine learning algorithm. Reference may be made to the description of the first sound feature correlation regarding the training of the second sound feature correlation, which will not be repeated here. Each second sound feature correlation includes a weight coefficient corresponding to a second extraction model of the microphone 11-1, . . . , 11-M. During a training process of the second extraction model, the part belonging to a certain estimated sound source signal of the known input signal received by each microphone 11-1, . . . , 11-M is known, so each known input signal (that is, a known model output sample) and the part belonging to the estimated sound source signal (that is, a known model output sample) may be used as training samples for the second extraction model, so as to train/optimize the second extraction model.

In an embodiment, the processor 130 may define a second loss function. The second loss function is based on a difference between a part of a known input signal of each microphone 11-1, . . . , 11-M estimated to belong to a certain estimated sound source signal based on the second sound feature correlation and the (real) estimated sound source signal. The processor 130 may minimize the second loss function to determine the weight coefficient of the second extraction model. For details about the definition of the second loss function and the minimization of the second loss function, reference may be respectively made to the descriptions of the loss function and the minimization of the loss function, which will not be repeated here.

Taking FIG. 4 as an example, the processor 130 may respectively extract re-extraction signals $z_{x1}^{y1}$, $z_{x1}^{y2}$, and $z_{x1}^{y3}$ of the estimated sound source signals $y_1$, $y_2$, and $y_3$ belonging to the three sound sources from the primary extraction signal $x_1^B$, respectively extract re-extraction signals $z_{x2}^{y1}$, $z_{x2}^{y2}$, and $z_{x3}^{y3}$ of the estimated sound source signals $y_1$, $y_2$, and $y_3$ belonging to the three sound sources from the primary extraction signal $x_2^B$, and respectively extract re-extraction signals $z_{x3}^{y1}$, $z_{x3}^{y2}$, and $z_{x3}^{y3}$ of the estimated sound source signals $y_1$, $y_2$, and $y_3$ belonging to the three sound sources from the primary extraction signal $x_3^B$.

Please refer to FIG. 3. The processor 130 determines a distance of the first source relative to the microphone array according to a power ratio (Step S360). Specifically, the power ratio is a ratio of a first value to a second value, the first value is a sum of powers of the re-extraction signals corresponding to the first source (for example, the sound source $S_1$ of FIG. 2) and corresponding to other microphones 11-2 to 11-M that are not the (first) microphone 11-1 in the microphone array 110, and the second value is a power of the re-extraction signal corresponding to the first source and corresponding to the (first) microphone 11-1. The power is, for example, the square of the amplitude of a signal. Taking the three microphones 11-1 to 11-3 as an example, $$R_p^{y1} = \frac{p_{x2}^{y1} + p_{x1}^{y1}}{p_{x3}^{y1}},$$

where $R_p^{y1}$ is the power ratio, $p_{x2}^{y1}+p_{x1}^{y1}$ is the first value ($p_{x2}^{y1}$ is the power of the re-extraction signal corresponding to the sound source $S_1$ and corresponding to the microphone 11-2, and $p_{x1}^{y1}$ is the power of the re-extraction signal corresponding to the sound source $S_1$ and corresponding to the microphone 11-3), and $p_{x3}^{y1}$ is the second value.

It is worth noting that the powers of the signals from the sound source $S_1$ reaching different microphones 11-1 to 11-M linearly attenuate as the distance (relative to the microphones 11-1 to 11-M or the microphone array 110) increases. The microphone 11-1 is closer to the first source than the other microphones 11-2 to 11-M. Therefore, the smaller the power ratio (that is, the smaller the difference between the first value and the second value), the closer the distance of the first source relative to the microphone array 110. In addition, the greater the power ratio (that is, the greater the difference between the first value and the second value), the further the distance of the first source relative to the microphone array 110. Taking FIG. 2 as an example, when $R_p^{y1}=1$, the distance of the user (for example, the sound source $S_1$) relative to the screen of the notebook computer 200 may be 50 centimeters (cm); and when $R_p^{y1}=1.5$, the distance of the user (for example, the sound source $S_1$) relative to the screen of the notebook computer 200 may be 100 centimeters.

In an embodiment, the processor 130 may determine the distance of the first source relative to the microphone array 110 according to a distance relationship ratio. The distance relationship ratio is a ratio of a third value to a fourth value, the third value is a distance coefficient, the fourth value is a difference between one and a fifth value, and the fifth value is a product of an adjustment coefficient and the power ratio. For example, a distance $$D_p^{y1} = \frac{\gamma}{1 - \alpha \cdot R_p^{y1}},$$

where $\gamma$ is the distance coefficient, $1 - \alpha \cdot R_p^{y1}$ is the fourth value, $\alpha \cdot R_p^{y1}$ is the fifth value, $\alpha$ is the adjustment coefficient, and $R_p^{y1}$ is the power ratio. The distance coefficient is a distance between the microphone closest to the first source and the first source. The distance coefficient is, for example, 25, 30, or 40 centimeters, but not limited thereto.

Similarly, the processor 130 may respectively determine distances of other sound sources relative to the microphone array 110. For example, the first value and the second value are respectively changed to values corresponding to other sound sources. Taking the first value as an example, the first value may be changed to a sum of powers of re-extraction signals corresponding to another sound source and corresponding to other microphones that are not the first microphone in the microphone array. Taking the second value as an example, the second value may be changed to a power of a re-extraction signal corresponding to another sound source and corresponding to the first microphone. The detailed description thereof will not be repeated.

It should be noted that the representative position of the microphone array 110 may be the position of any microphone 11-1 to 11M or a statistical value (for example, the center of gravity or the geometric center) thereof and is used to determine the distance of the sound source relative to the microphone array 110.

Please refer to FIG. 3. The processor 130 determines the estimated sound source signal corresponding to the first source according to a distance limit (Step S370). Specifically, the distance of the first source relative to the microphone array 110 is within the distance limit. The distance limit is, for example, 45, 50, or 60 centimeters. It should be noted that the value of the distance limit may be adjusted according to actual requirements and is not limited to the above examples. The definition of the distance limit may be related to the distance of the user relative to the sound signal processing apparatus 100 and may be based on statistics or actual data.

It is assumed that the first source is located within the distance limit, and the sound source signal of the sound source within the distance limit is the sound signal to be retained (for subsequent sound signal processing or applications such as recording or calling). If the first source is within the distance limit (that is, the distance of the first source relative to the microphone array 110 is less than or equal to the distance limit), the processor 130 retains the estimated sound source signal of the first source. Taking FIG. 4 as an example, the processor 130 retains the estimated sound source signal $y_1$.

In an embodiment, in response to the distance of another source that is not the first source among the sound sources relative to the microphone array 110 being within the distance limit, the processor 130 may retain the estimated sound source signal corresponding to the another source (for subsequent sound signal processing or applications such as recording or calling). In other words, more than one sound source is located within the distance limit. At this time, the estimated sound source signals of the sound sources located within the distance limit may be retained.

In response to the distance of the another source relative to the microphone array 110 being not within the distance limit, the processor 130 may remove the estimated sound source signal corresponding to the another source. In other words, the another source is outside the distance limit. Therefore, the processor 130 may filter, ignore, or delete the estimated sound source signal (regarded as an interference signal) corresponding to the another source.

In other embodiments, the processor 130 may only retain the estimated sound source signal of the nearest sound source within the distance limit. It is assumed that the main user is closest to the sound signal processing apparatus 100. In other words, even if there are more than one sound sources located within the distance limit, only the estimated sound source signal of the nearest sound source is retained, and the estimated sound source signals of the other sound sources are removed.

Figure 7:
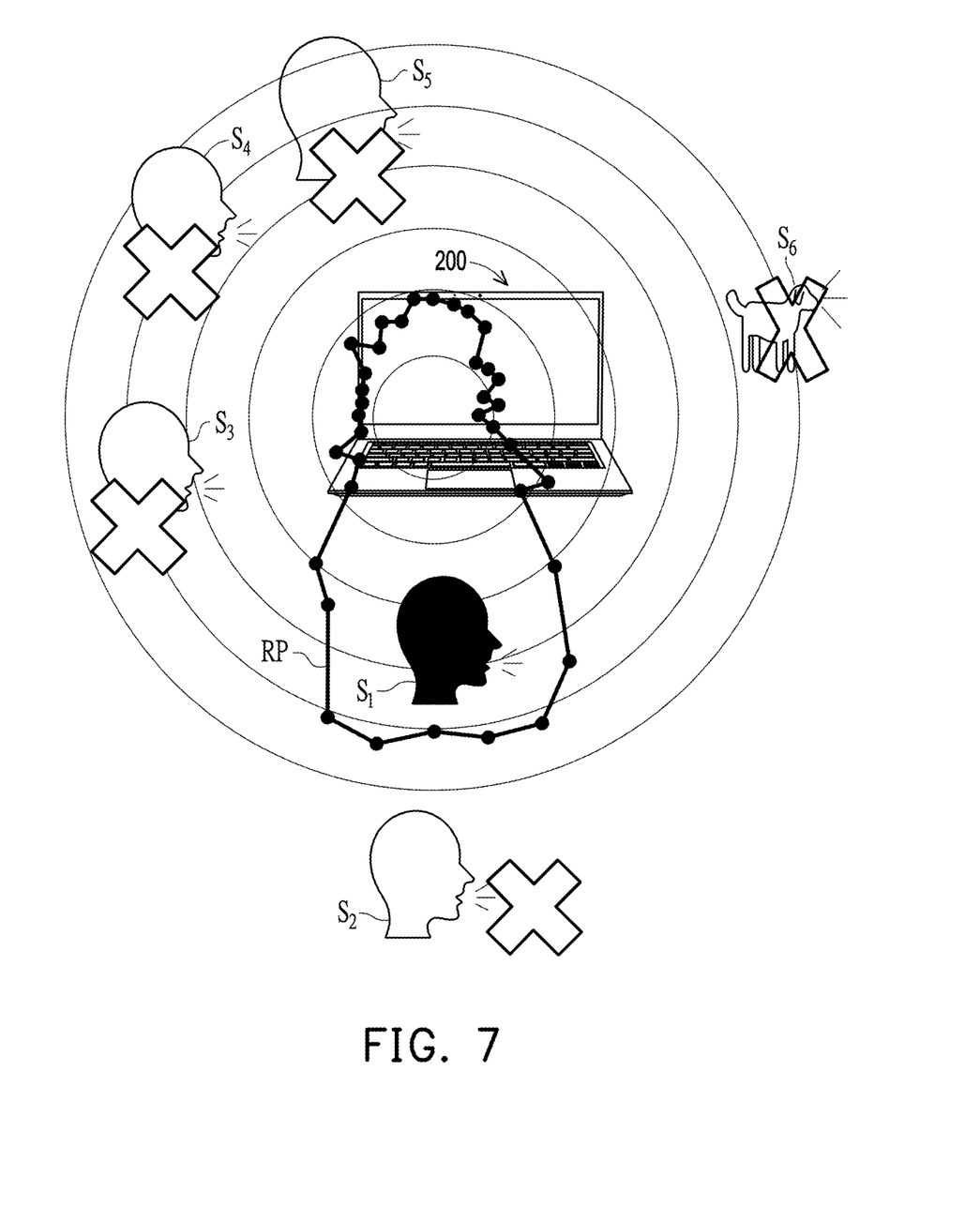
FIG. 7 is a schematic diagram illustrating a positional relationship according to an embodiment of the disclosure.

For example, FIG. 7 is a schematic diagram illustrating a positional relationship according to an embodiment of the disclosure. Please refer to FIG. 7. It is assumed the distance limit is 50 centimeters. Sound sources $S_1$, $S_3$, $S_4$, $S_5$, and $S_6$ are located within the distance limit, but the radiation pattern RP only covers the sound source $S_1$. Therefore, only the estimated sound source signal of the sound source $S_1$ is retained. Even if the radiation pattern RP further covers the sound source $S_2$, but the sound source $S_2$ is located outside the distance limit, so the estimated sound source signal of the sound source $S_2$ may still be removed.

In summary, in the sound receiving processing method and the sound signal processing apparatus of the embodiments of the disclosure, the main sound signal corresponding to the radiation pattern is formed through beamforming, the primary extraction signals corresponding to the main sound signal are extracted from the input sound signals of different microphones, the estimated sound source signals of different sound sources are separated from the primary extraction signals, and the re-extraction signals corresponding to different sound sources are extracted from the primary extraction signals. The re-extraction signals may be used to estimate the distance of the sound source relative to the microphone array, and the distance may be used to filter the estimated sound source signal to be retained. In this way, only the sound signal of the main user can be received, so as to improve the recording or call quality.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A sound receiving processing method, comprising:
 receiving a plurality of input sound signals through a microphone array, wherein the microphone array comprises a plurality of microphones respectively receiving the input sound signals;
 combining the input sound signals into a main sound signal based on beamforming, wherein the beamforming is used to form the microphone array into a radiation pattern corresponding to a first source among a plurality of sound sources, and a first microphone in the microphone array is closer to the first source than other microphones;
 respectively extracting a plurality of primary extraction signals belonging to the main sound signal from the input sound signals, wherein a plurality of first sound feature correlations between the input sound signals and the main sound signal are respectively trained in advance, and the first sound feature correlation is used to extract a part belonging to the main sound signal;

separating a plurality of estimated sound source signals corresponding to the sound sources from the primary extraction signals through blind signal separation (BSS);

respectively extracting a plurality of re-extraction signals belonging to the estimated sound source signals from the primary extraction signals, wherein a plurality of second sound feature correlations between the primary extraction signals and the estimated sound source signals are respectively trained in advance, and the second sound feature correlations are respectively used to extract parts belonging to the estimated sound source signals;

determining a distance of the first source relative to the microphone array according to a power ratio, wherein the power ratio is a ratio of a first value to a second value, the first value is a sum of powers of the re-extraction signals corresponding to the first source and corresponding to other microphones that are not the first microphone in the microphone array, the second value is a power of one of the re-extraction signals corresponding to the first source and corresponding to the first microphone; and determining one of the estimated sound source signals corresponding to the first source according to a distance limit, wherein the distance of the first source relative to the microphone array is within the distance limit.

2. The sound receiving processing method according to claim 1, wherein the step of determining the distance of the first source relative to the microphone array according to the power ratio comprises:

determining the distance of the first source relative to the microphone array according to a distance relationship ratio, wherein the distance relationship ratio is a ratio of a third value to a fourth value, the third value is a distance coefficient, the fourth value is a difference between one and a fifth value, and the fifth value is a product of an adjustment coefficient and the power ratio.

3. The sound receiving processing method according to claim 1, wherein the smaller the power ratio, the closer the distance of the first source relative to the microphone array, and the greater the power ratio, the further the distance of the first source relative to the microphone array.

4. The sound receiving processing method according to claim 1, further comprising:

retaining one of the estimated sound source signals corresponding to another source that is not the first source among the sound sources in response to a distance of the another source relative to the microphone array being within the distance limit; and removing the one of the estimated sound source signals corresponding to the another source in response to the distance of the another source relative to the microphone array being not within the distance limit.

5. The sound receiving processing method according to claim 1, further comprising:

respectively training the first sound feature correlations between the main sound signal and a plurality of known input signals corresponding to the microphones of the microphone array through a machine learning algorithm, wherein each of the first sound feature correlations comprises a weight coefficient corresponding to an extraction model of one of the microphones; and respectively determining parts of the input sound signals belonging to the main sound signal through the extraction models corresponding to the microphones.

6. The sound receiving processing method according to claim 5, wherein the machine learning algorithm is a back-propagation multi-layer perceptron (MLP), and the step of training the first sound feature correlation comprises:

defining a loss function, wherein the loss function is based on a difference between a part of the known input signal of each of the microphones estimated to belong to the main sound signal based on the first sound feature correlation and the main sound signal; and minimizing the loss function to determine the weight coefficient of the extraction model.

7. The sound receiving processing method according to claim 1, further comprising:

respectively training the second sound feature correlations between the estimated sound source signals and a plurality of known input signals corresponding to the microphones of the microphone array through a machine learning algorithm, wherein each of the second sound feature correlations comprises a weight coefficient corresponding to a second extraction model of one of the microphones; and respectively determining parts of the input sound signals belonging to the estimated sound signal through the second extraction models corresponding to the microphones.

8. The sound receiving processing method according to claim 7, wherein the step of training the second sound feature correlation comprises:

defining a second loss function, wherein the second loss function is based on a difference between a part of the known input signal of each of the microphones estimated to belong to the estimated sound signal based on the second sound feature correlation and the estimated sound signal; and minimizing the second loss function to determine the weight coefficient of the second extraction model.

9. A sound signal processing apparatus, comprising:

a microphone array, comprising a plurality of microphones respectively receiving a plurality of input sound signals;

a storage, used to store a program code; and a processor, coupled to the microphone array and the storage, and used to load the program code to execute:

combining the input sound signals into a main sound signal based on beamforming, wherein the beamforming is used to form the microphone array into a radiation pattern corresponding to a first source among a plurality of sound sources, and a first microphone in the microphone array is closer to the first source than other microphones;

respectively extracting a plurality of primary extraction signals belonging to the main sound signal from the input sound signals, wherein a plurality of first sound feature correlations between the input sound signals and the main sound signal are respectively trained in advance, and the first sound feature correlation is used to extract a part belonging to the main sound signal;

separating a plurality of estimated sound source signals corresponding to the sound sources from the primary extraction signals through blind signal separation;

respectively extracting a plurality of re-extraction signals belonging to the estimated sound source signals from the primary extraction signals, wherein a plurality of second sound feature correlations between the primary extraction signals and the estimated sound source signals are respectively trained in advance, and the second sound feature correlations are respectively used to extract parts belonging to the estimated sound source signals;

determining a distance of the first source relative to the microphone array according to a power ratio, wherein the power ratio is a ratio of a first value to a second value, the first value is a sum of powers of the re-extraction signals corresponding to the first source and corresponding to other microphones that are not the first microphone in the microphone array, and the second value is a power of one of the re-extraction signals corresponding to the first source and corresponding to the first microphone; and determining one of the estimated sound source signals corresponding to the first source according to a distance limit, wherein the distance of the first source relative to the microphone array is within the distance limit.

10. The sound signal processing apparatus according to claim 9, wherein the processor is further configured to:

determine the distance of the first source relative to the microphone array according to a distance relationship ratio, wherein the distance relationship ratio is a ratio of a third value to a fourth value, the third value is a distance coefficient, the fourth value is a difference between one and a fifth value, and the fifth value is a product of an adjustment coefficient and the power ratio.

11. The sound signal processing apparatus according to claim 9, wherein the smaller the power ratio, the closer the distance of the first source relative to the microphone array, and the greater the power ratio, the further the distance of the first source relative to the microphone array.

12. The sound signal processing apparatus according to claim 9, wherein the processor is further configured to:

retain one of the estimated sound source signals corresponding to another source that is not the first source among the sound sources in response to a distance of the another source relative to the microphone array being within the distance limit; and remove the one of the estimated sound source signals corresponding to the another source in response to the distance of the another source relative to the microphone array being not within the distance limit.

13. The sound signal processing apparatus according to claim 9, wherein the processor is further configured to:

respectively train the first sound feature correlations between the main sound signal and a plurality of known input signals corresponding to the microphones of the microphone array through a machine learning algorithm, wherein each of the first sound feature correlations comprises a weight coefficient corresponding to an extraction model of one of the microphones; and respectively determine parts of the input sound signals belonging to the main sound signal through the extraction models corresponding to the microphones.

14. The sound signal processing apparatus according to claim 13, wherein the machine learning algorithm is a backpropagation multi-layer perceptron, and the processor is further configured to:

define a loss function, wherein the loss function is based on a difference between a part of the known input signal of each of the microphones estimated to belong to the main sound signal based on the first sound feature correlation and the main sound signal; and minimize the loss function to determine the weight coefficient of the extraction model.

15. The sound signal processing apparatus according to claim 9, wherein the processor is further configured to:

respectively training the second sound feature correlations between the estimated sound source signals and a plurality of known input signals corresponding to the microphones of the microphone array through a machine learning algorithm, wherein each of the second sound feature correlations comprises a weight coefficient corresponding to a second extraction model of one of the microphones; and respectively determining parts of the input sound signals belonging to the estimated sound signal through the second extraction models corresponding to the microphones.

16. The sound signal processing apparatus according to claim 15, wherein the processor is further configured to:

defining a second loss function, wherein the second loss function is based on a difference between a part of the known input signal of each of the microphones estimated to belong to the estimated sound signal based on the second sound feature correlation and the estimated sound signal; and minimizing the second loss function to determine the weight coefficient of the second extraction model.

* * * * *